F. SUTCLIFFE.
BOILER STAND.
APPLICATION FILED JUNE 10, 1913.
1,109,556.
Patented Sept. 1, 1914.
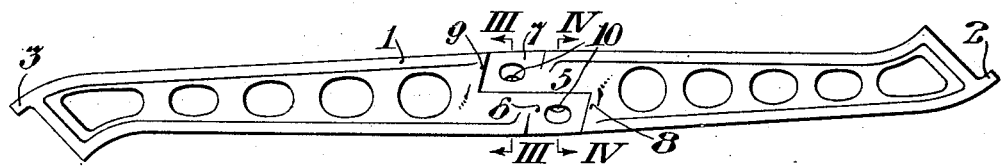
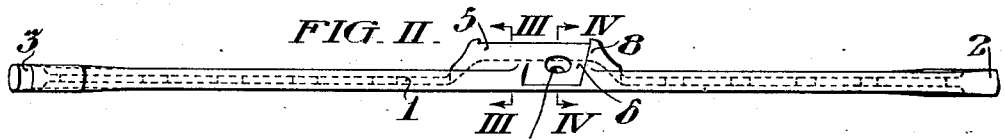
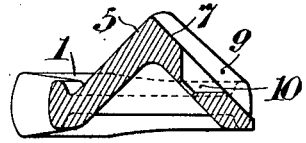 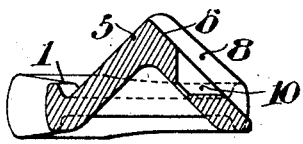
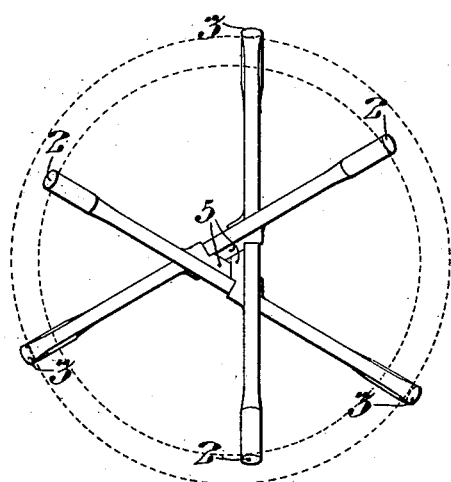 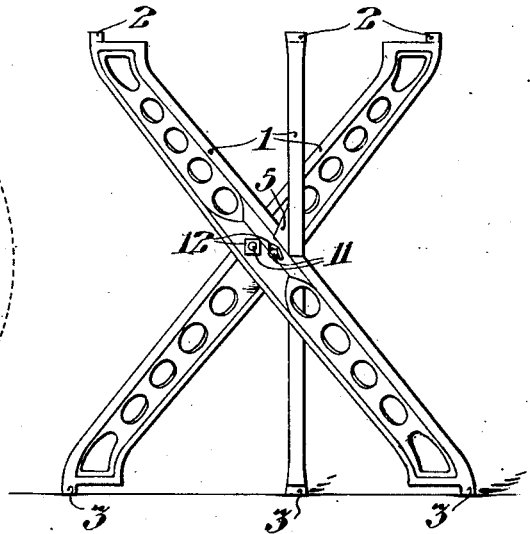
WITNESSES:
Philip W. Vessey
Joseph E. Segal
INVENTOR:
Frank Sutcliffe,
by Arthur E. Paige
Attorney.

UNITED STATES PATENT OFFICE.

FRANK SUTCLIFFE, OF CONSHOHOCKEN, PENNSYLVANIA.

BOILER-STAND.

1,109,556.  Specification of Letters Patent.  Patented Sept. 1, 1914.

Application filed June 10, 1913. Serial No. 772,897.

*To all whom it may concern:*

Be it known that I, FRANK SUTCLIFFE, a citizen of the United States, residing at Conshohocken, in the county of Montgomery and State of Pennsylvania, have invented a certain new and useful Improvement in Boiler-Stands, whereof the following is a specification, reference being had to the accompanying drawings.

My invention relates to stands comprising a plurality of legs, all of which are alike in construction and arrangement, so shaped that they may be rigidly bolted together without intermediate coupling pieces.

As hereinafter described my invention includes a reversible boiler stand comprising a plurality of legs each having a boiler retaining lug at each end, an angular flanged portion intermediate of its length, having two plane faces outwardly divergent with respect to the axis of the stand and including between them a sector of a circle concentric with said axis, retaining ledges at the opposite ends of said sectoral portions, said ledges extending transversely with respect to the length of the leg and in cassated directions upon the respective plane faces of said portions, the ledges upon each face being parallel with each other and so spaced as to fit the complementary sectoral face of the contiguous leg and retain the latter in diagonal transverse relation to the axis of the stand; a bolt opening through each of said angular flanges intermediate of said ledges; and bolts extending through said openings in contiguous angular flanges of adjoining legs, each bolt having a head bearing upon one leg and a nut bearing upon the other contiguous leg; whereby, the opposite ends of each leg member are respectively presented at the top of the stand upon one side of its axis and at the bottom of the stand upon the opposite side of its axis; said ends being at respectively different radial distances from said axis, so that the stand may be reversed to hold boilers of different diameters at its respectively opposite ends.

My invention comprises the various novel features of construction and arrangement hereinafter more definitely specified.

In the drawings: Figure I is an inside elevation of one of the leg members of the stand. Fig. II is an edge view of said member. Fig. III is a transverse sectional view of said member taken on the line III, III in Figs. I and II. Fig. IV is a transverse sectional view of said member taken on the line IV, IV in Figs. I and II. Fig. V is a plan view of a boiler stand formed of three of said members. Fig. VI is an elevation of said stand.

The reversible boiler stand shown in Figs. V and VI is formed of three counterpart legs 1 shown in the other figures, each having boiler retaining lugs 2 and 3 at its respectively opposite ends, an angular flanged portion 5 intermediate of its length, having two plane faces 6 and 7 outwardly divergent with respect to the axis of the stand and including between them a sector of a circle concentric with said axis, retaining ledges 8 and 9 at the respectively opposite ends of said sectoral portions 5, said ledges extending transversely with respect to the length of the leg and in cassated directions upon the respective plane faces 6 and 7 thereof, the ledges upon each of said faces being parallel with each other and so spaced as to fit the complementary sectoral face of the contiguous leg and retain the latter in diagonal transverse relation to the axis of the stand. It may be observed that said ledges upon the respective legs, being arranged to engage the contiguous legs, predetermine the relative angular position thereof. Each of said legs has a bolt opening 10 through each of the angular flanges of its sectoral portion 5 intermediate of said ledges, to receive the bolts 11 extending through said openings in contiguous angular flanges of adjoining legs, each bolt having a head 12 bearing upon one leg and a nut 13 bearing upon the other contiguous leg.

It may be observed that the arrangement above described is such that the opposite ends of each leg member of the stand are respectively presented at the top of the stand upon one side of its axis and at the bottom of the stand upon the opposite side of its axis; said ends being at respectively different radial distances from said axis, so as to present the boiler retaining lugs 2 and 3 at respectively different radial distances from said axis, so that the stand may be reversed to hold boilers of different diameters at its respectively opposite ends. Said stand being formed of three leg members; each includes between its outwardly divergent plane faces 6 and 7 a one hundred and twenty degree sector of a circle concentric with the axis of the stand; the three sectoral angular portions being thus complementary to complete the circle. However, it is to be understood that if a larger number of legs are employed to form the stand, the angles of the sectoral portions thereof will be correspondingly less. Moreover it is to be understood that by changing the transverse direction of said ledges 8 and 9 upon the respective legs, the relative angular relation of the latter in the stand may be changed, to change the diameters of the opposite ends of the stand to fit boilers of different sizes.

I do not desire to limit myself to the precise details of construction and arrangement herein set forth as it is obvious that various modifications may be made therein without departing from the essential features of my invention as defined in the appended claims.

I claim:—

1. A reversible boiler stand comprising a plurality of legs each having a boiler retaining lug at each end, an angular flanged portion intermediate of its length, having two plane faces outwardly divergent with respect to the axis of the stand and including between them a sector of a circle concentric with said axis, retaining ledges at the opposite ends of said sectoral portions, said ledges extending transversely with respect to the length of the leg and in cassated directions upon the respective plane faces of said portions, the ledges upon each face being parallel with each other and so spaced as to fit the complementary sectoral face of the contiguous leg and retain the latter in diagonal transverse relation to the axis of the stand; a bolt opening through each of said angular flanges intermediate of said ledges; and bolts extending through said openings in contiguous angular flanges of adjoining legs, each bolt having a head bearing upon one leg and a nut bearing upon the other contiguous leg; whereby, the opposite ends of each leg member are respectively presented at the top of the stand upon one side of its axis and at the bottom of the stand upon the opposite side of its axis; said ends being at respectively different radial distances from said axis, so that the stand may be reversed to hold boilers of different diameters at its respectively opposite ends.

2. A reversible boiler stand comprising a plurality of legs each having a boiler retaining lug at each end, an angular flanged portion intermediate of its length, having two plane faces outwardly divergent with respect to the axis of the stand and including between them a sector of a circle concentric with said axis, retaining ledges at the opposite ends of said sectoral portions, said ledges extending transversely with respect to the length of the leg and in cassated directions upon the respective plane faces of said portions, the ledges upon each face being parallel with each other and so spaced as to fit the complementary sectoral face of the contiguous leg and retain the latter in diagonal transverse relation to the axis of the stand; and connecting means; whereby, the opposite ends of each leg member are respectively presented at the top of the stand upon one side of its axis and at the bottom of the stand upon the opposite side of its axis; said ends being at respectively different radial distances from said axis, so that the stand may be reversed to hold boilers of different diameters at its respectively opposite ends.

3. A boiler stand comprising a plurality of legs each having an angular flanged portion intermediate of its length, having two plane faces outwardly divergent with respect to the axis of the stand and including between them a sector of a circle concentric with said axis, retaining ledges at the opposite ends of said sectoral portions, said ledges extending transversely with respect to the length of the leg, the ledges upon each face being parallel with each other and so spaced as to fit the complementary sectoral face of the contiguous leg and retain the latter in diagonal transverse relation to the axis of the stand; and connecting means; whereby, the opposite ends of each leg member are respectively presented at the top of the stand upon one side of its axis and at the bottom of the stand upon the opposite side of its axis.

4. A boiler stand comprising three legs each having an angular flanged portion intermediate of its length, having two plane faces outwardly divergent with respect to the axis of the stand and including between them a one hundred and twenty degree sector of a circle concentric with said axis, retaining ledges at the opposite ends of said sectoral portions, said ledges extending transversely with respect to the length of the leg, the ledges upon each face being parallel with each other and so spaced as to fit the complementary sectoral face of the contiguous leg and retain the latter in diagonal transverse relation to the axis of the stand; and connecting means; whereby, the opposite ends of each leg member are respectively presented at the top of the stand upon one side of its axis and at the bottom of the stand upon the opposite side of its axis.

5. A boiler stand comprising legs each having an angular flanged portion intermediate of its length, having two plane faces outwardly divergent with respect to the axis of the stand and including between them a sector of a circle concentric with said axis, retaining ledges at the opposite ends of said sectoral portions, said ledges extending transversely with respect to the length of the leg, the ledges upon each face being parallel with each other and so spaced as to fit the complementary sectoral face of the contiguous leg and retain the latter in diagonal transverse relation to the axis of the stand; and connecting means; whereby, the opposite ends of each leg member are respectively presented at the top of the stand upon one side of its axis and at the bottom of the stand upon the opposite side of its axis.

6. A boiler stand comprising legs each having an angular flanged portion intermediate of its length, having two plane faces outwardly divergent with respect to the axis of the stand and including between them a sector of a circle concentric with said axis, retaining ledges at the opposite ends of said sectoral portions, said ledges extending transversely with respect to the length of the leg, the ledges upon each face being so spaced as to fit the complementary sectoral face of the contiguous leg and retain the latter in diagonal transverse relation to the axis of the stand; and connecting means; whereby, the opposite ends of each leg member are respectively presented at the top of the stand upon one side of its axis and at the bottom of the stand upon the opposite side of its axis.

In testimony whereof, I have hereunto signed my name at Conshohocken, Pennsylvania, this third day of June, 1913.

FRANK SUTCLIFFE.

Witnesses:
G. EDWARD KIMPER,
DAVID M. RAMSEY.

Copies of this patent may be obtained for five cents each, by addressing the "Commissioner of Patents, Washington, D. C."